July 15, 1958     R. I. BRADLEY     2,842,935

SPRING AND COLLET ASSEMBLIES

Filed March 15, 1956

Inventor
Robert I. Bradley

United States Patent Office 2,842,935
Patented July 15, 1958

2,842,935
SPRING AND COLLET ASSEMBLIES
Robert I. Bradley, Belmont, Mass.
Application March 15, 1956, Serial No. 571,657
10 Claims. (Cl. 58—115)

This invention relates to spiral springs such as are used in horological and other measuring and indicating instruments, and more especially to a novel spring assembly including a spring and collet. As here illustrated, by way of example, the spring is a hairspring.

Customarily, hairsprings are supplied to the user either plain, that is to say, without any mounting means (the latter being supplied by the user) or with a metallic collet or bushing secured to the inner end of the spring coil, the bushing or collet having a central bore for the reception of the staff.

Since hairsprings are commonly located in very restricted spaces, the mounting collet or bushing must in many instances be of very small dimensions. Moreover, the hairspring is of specially processed material, usually very fine tempered steel wire and its properties must not be changed during the mounting operation. Quite commonly, the inner end portion of the spring (the part which is gripped by the mechanism which forms the coil) is depended upon for anchoring the coil to the collet, but as this inner end portion, particularly in fine springs, bends easily, the usual mechanical connection of the metal spring to the metal collet by the customary means is uncertain and inadequate. These and other limitations have made it very difficult properly and securely to anchor the metal spring to a metallic mounting collet. The connection of the spring to the collet is further complicated by the fact that, for accuracy of operation, the plane of the spring must be perpendicular to the axis of the bore in the collet; the center of gravity of the spring coil should coincide with the axis of the bore in the collet; the spring should leave the collet without frictional contact of the free portion of the spring with the outer periphery of the collet; and the spring must be immovably anchored to the collet with the collet properly centered within the spring. The many prior patents on the collet-and-spring assemblies confirm the truth of the above statements and bear testimony to the fact that the problem thus presented has not heretofore been satisfactorily solved.

Many suggestions have heretofore been made for overcoming the above difficulties, but while some prior suggestions have been accorded the reward of patent protection, and while some such suggestions appear to have merit, theoretically at least, they involve too great an expense in material or labor cost or involve other practical disadvantages for general adoption. Some such expedients may meet one or more but not all of the requirements, and in almost all prior procedures it is necessary, as a final step, to true up the spring and collet by bending the spring. This is an operation which requires a high degree of skill and is thus costly, and, at best, there is a substantial percentage of loss due to unavoidable injury to the springs. In some types of instrument, or for convenience in the instrument assembly, it would be desirable to use a collet of special configuration or color, but usual prior procedures are not well adapted to meet these requirements, at least within cost limitations.

Among the objects of the present invention are to provide a novel mounting for a spiral spring such that the spring is securely and permanently united to its collet with the plane of the spring accurately perpendicular to the axis of the collet bore; to provide a collet-and-spring assembly wherein the collet is of a material of less weight than the metal customarily used for the purpose, thus reducing the mass and inertia of the assembly; to provide a mounting of a simple shape and of such dimensions that it may be made cheaply; to provide a mounting such that the exposed portion of the inner coil of the spring is free from frictional engagement with the collet; to provide a mounting whereby a substantial length of the spring is firmly gripped and held by the collet; to provide a spring-and-collet assembly wherein the collet is of non-metallic material; to provide a collet which may be given any desired configuration or color without a prohibitive increase in cost; to provide a collet having means facilitating its application to a staff; to provide a spring-and-collet assembly wherein, although the collet be of a material which is a non-conductor of electricity, the inner end of the spring may make conducting contact with the staff on which the assembly may be mounted. Other and further objects and advantages of the invention will be pointed out in the following description and by reference to the accompanying drawings, wherein:

Figure 1:
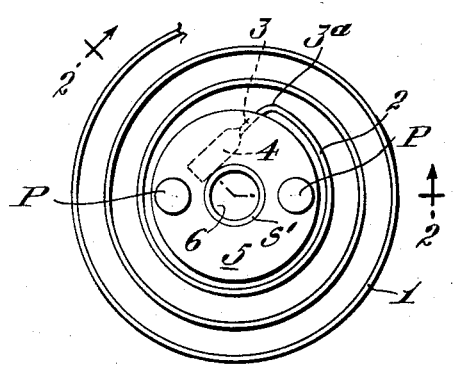
Fig. 1 is a plan view, to large scale, of a hairspring and collet illustrative of one embodiment of the present invention, the outer end of the hairspring being broken away.

Referring to the drawings, the numeral 1 indicates a flat spiral hairspring of generally conventional type, consisting of a length of tempered spring wire of rectangular transverse section, that dimension of said transverse section which is parallel to the axis of the coil being greater than that dimension of said section which is perpendicular to the axis of the coil. The inner end of the central coil 2 has an integral tailpiece 3 (which is the part which is seized and held by the coiling tool during the coiling operation). As shown in Fig. 1, the free end 4 of the tailpiece or anchorage part 3 is twisted approximately 90° so that the longer dimension of its transverse section is perpendicular to the axis of the coil, thus providing a positive lock to prevent pulling the spring out of the collet. The anchorage portion or tailpiece of the coil is firmly embedded within the substance of the collet 5.

The collet shown in Fig. 1 is a unitary, circular disk of molded material having the bore 6 whose axis is accurately perpendicular to the plane of the coil 2. The material of the annular collet 5 may, for example, be a molded synthetic resin, for instance nylon, methyl methacrylate or a styrene resin, or it may be of any other suitable material capable of being molded at a temperature which is harmless to the spring, and which, after completion, is of shape-retaining character and has the requisite strength and rigidity.

If desired, the bore in the collet may have a metal liner sleeve as shown at S' (Figs. 1 and 2), such a liner being desirable when the selected collet-forming material is not strong enough firmly to grip the staff on which the collet may be mounted. As shown in Fig. 1, the end portion 4 of the tail piece 3 of the coil contacts the metal liner S'.

In making the assembly, the anchorage portion or tailpiece 3 of the coil is placed within a mold cavity (not illustrated) properly shaped to form the collet 5; the spring is firmly held in accurate relation to the mold device; and then the material which is to form the collet is introduced into the mold cavity in accordance with any usual procedure. To insure proper balance when the assembly is mounted on a staff it is desirable to make the collet in the form of a simple cylindrical disk having parallel flat or nearly flat upper and lower faces or with but slight variation from such shape, the method herein disclosed making it possible to employ such a simple form of collet while at the same time obtaining the desirable characteristics above pointed out. The mold may be so designed as to form the bore 6 with its axis accurately perpendicular to the plane of the spring. When the collet is of molded material according to the present invention, it is readily possible to form a non-circular bore, for instance a square bore to receive a squared portion of a staff, thus providing against relative rotation of the collet and staff. If the bore in the collet is to be provided with a metal lining sleeve, this sleeve will be placed in proper position in the mold cavity before the introduction of the collet-forming substance. The spring is so positioned relatively to the mold device that when the molding operation is completed, the junction $3^a$ of the inner coil proper with the tail piece 3 is spaced outwardly from the peripheral surface of the collet, thus providing clearance between the coil 2 and the collet.

The molding of the collet-forming material about the anchorage portion 3 of the spring firmly embeds the anchorage portion of the spring within the substance of the collet, and the setting of the material of the collet causes the part 3 to be gripped and so closely and firmly held that there is no possibility of relative movement of the parts 4 and 5. Some, at least, of the plastics appropriate for use in making the collet are so compatible with the metal as to form an adhesive bond with the metal of the spring, thus further assuring a good anchorage. Desirably the molding operation is so performed as to provide a collet with diametrically opposed projections or bosses P on one of its flat faces, such projections being useful in orienting the collet relatively to a staff on which it is being mounted.

Figure 2:
Fig. 2 is a section on the line 2—2 of Fig. 1.
Figure 7:
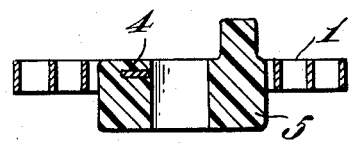
Fig. 7 is a section similar to Fig. 2, but showing the spring located near one of the flat faces of the collet.
Figure 4:
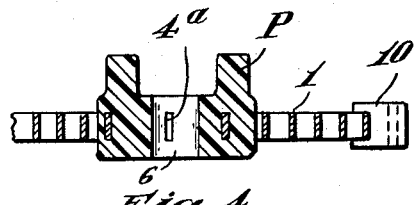
Fig. 4 is a section on the line 4—4 of Fig. 3.

Methods appropriate to the molding of collet-forming material such as above suggested may be carried out at temperatures which do not injure the spring. As above noted, the molding device will be provided with means for securely and accurately holding the spring coil in the desired position during the molding operation and thus, when the molding operation is completed, the location of the spring with reference to the axis of the collet will be accurate and no subsequent truing operation is necessary. The molding operation does not subject the inner end portion of the spring to any appreciable distorting force, so that at the completion of the molding the spring is free from internal strains such as might throw it out of true. As illustrated in Figs. 2 and 4, the plane of the spring coil is located substantially midway between the opposite end faces of the collet, the anchorage portion 4 of the spring being completely embedded in the substance of the collet so that it does not appear at either face of the latter. However, the spring need not be midway between the end faces of the collet. Thus, as illustrated in Fig. 7, the spring is nearer the upper end face T of the collet than to the lower face.

Figure 3:
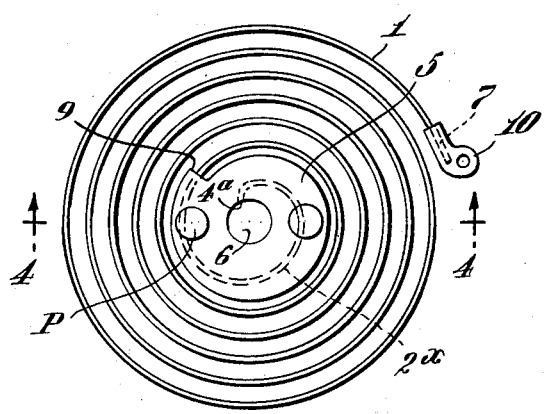
Fig. 3 is a plan view of a hairspring assembly, the hairspring being of a slightly modified shape as compared with that of Fig. 1.
Figure 5:
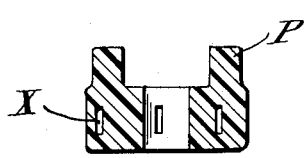
Fig. 5 is a section similar to that of Fig. 4 illustrative of the appearance of the collet were the spring to be dissolved away from the assembly.

In Figs. 3, 4 and 5 a modified construction is illustrated wherein substantially a complete turn $2^x$ of the spring is embedded within the collet. In this arrangement the peripheral edge of the collet has a radial shoulder 9 at which the spring emerges, thus providing clearance between the innermost exposed coil and the collet. In the illustrated arrangement the extreme inner end portion $4^a$ of the spring is so located as to be exposed within the bore 6 so that it may make metal-to-metal contact with the staff on which the coil is mounted, thus permitting the spring to form an element of an electrical circuit.

It may be noted that if the metallic spring were to be dissolved out of the collet-and-spring assembly, the collet itself would appear as illustrated in Fig. 5, having an internal channel X. Since, as the result of the molding operation, the inner coil of the spring actually occupies every bit of the space thus referred to as the "channel," with the walls of this imaginary channel in intimate contact with every point of the surface of the inner coil $2^x$, the coil is rigidly anchored to the collet without possibility of looseness or of relative displacement of the coil and collet.

As illustrated in Fig. 3, the outer end 7 of the hairspring is provided with a terminal piece 10 which, if desired, may also be a mass of molded material which is molded about the end of the spring so as to embed the latter and provide a firm and permanent union between the parts. If desired, the part 10 may be formed concomitantly with the molding of the collet.

The mold cavity employed may be so configured as to impart to the collet any desired external shape, and the plastic material used in forming the collet may be of any desired color.

Figure 6:
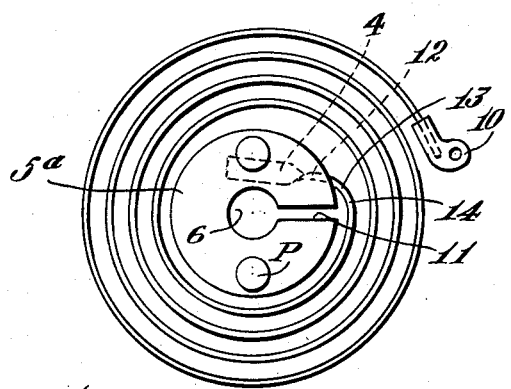
Fig. 6 is a view similar to Fig. 1, but illustrating a further modification.

As illustrated in Fig. 6, the collet $5^a$ has a radial slot 11 extending to its central bore 6. In this preferred construction the free end portion 4 of the tail piece of the inner coil of the spring is twisted, relatively to the main portion of the coil so that when embedded within the substance of the collet it provides a positive anchorage to prevent pulling the spring out of the collet. However, this twisted portion of the inner coil terminates at the point 12, spaced inwardly of the peripheral surface of the collet, the spring having an offset part 13 which extends from the point 12 outwardly through the peripheral surface of the collet to the point 14 which is spaced outwardly beyond said peripheral surface. From the point 14 the inner coil of the spring resumes its spiral curvature, this exposed portion of the inner coil being spaced from the periphery of the collet by the offset 13 so that its normal spring action is not affected or in any way interferred with by engagement with the collet.

The procedure herein described makes possible the mass production of hairspring assemblies, for example by the use of a turret-like molding apparatus, each assembly being accurately like every other and results in a very firm and secure anchorage of the spring to its mounting collet; the accurate assemblage of the parts so that the center of gravity of the coil will coincide with the axis of the bore in the collet and the plane of the coil is accurately perpendicular to the axis of said bore is easily accomplished; and the exposed portion of the helical part of the spring does not at any point contact the outer periphery of the collet; the spring is free from distorting internal strains, and no truing operation is required; and so much of the spring coil is gripped and firmly held between the opposing parts of the collet that there is no danger that the spring will be displaced during use.

While desirable embodiments of the invention have been illustrated by way of example, it is to be understood that the invention is broadly inclusive of any and all modifications falling within the scope of the appended claims.

I claim:

1. A spring assembly including a spiral spring and a collet, the latter being a disk of a substantially uniform axial thickness greater than that of the spiral spring and consisting of a unitary annular mass of material, the inner portion of the spring being firmly embedded within and adhesively and immovably bonded to said mass of material.

2. A spring assembly including a spiral spring and a substantially rigid collet, the latter being of substantially uniform axial thickness greater than that of the spiral spring and consisting of a unitary annular mass of a synthetic plastic which is hard and shape-retaining, the inner portion of the spring being permanently embedded within said mass of material, the plane of the spring being accurately perpendicular to the axis of the coil.

3. A hairspring assembly including a hairspring and a substantially rigid collet, the latter being of an axial thickness greater than that of the spring and consisting of a hard, shape-retaining unitary annular mass of molded organic material, the inner portion of the spring being embedded within said mass of material, the plane of the spring being perpendicular to the axis of the collet and substantially midway between the end faces of the collet.

4. A hairspring assembly according to claim 3 wherein the collet has a central bore and has diametrically opposed integral bosses projecting from one of its end surfaces.

5. A hairspring consisting of wire of rectangular section with the wider dimension of said section parallel to the axis of the coil and having a curved inner coil provided with an anchorage portion at its inner end, and a collet consisting of a unitary body of hard shape-retaining synthetic resin in which the anchorage portion of the spring is embedded and firmly held, the anchorage portion of the spring being twisted 90° with reference to the body portion of the spring, said unitary body of resin having an axial bore which is accurately perpendicular to the plane of the spring coil.

6. A spring assembly comprising a spiral spring and a collet, the spring consisting of wire of rectangular section with the wider dimension of said section parallel to the axis of the coil, the collet consisting of a unitary body of rigid material in which the inner end portion of the spring is embedded and firmly held, said inner end portion being so disposed that the wider dimension of its transverse section is perpendicular to the axis of the coil, said unitary body of material having a bore perpendicular to the plane of the spring.

7. A hairspring assembly comprising a hairspring having an inner coil, and a collet consisting of a unitary body of hard shape-retaining synthetic resin in which the inner coil of the spring is embedded and firmly held, said unitary body of resin having a bore perpendicular to the plane of the spring, the inner end of the spring terminating at said bore whereby, when the assembly is mounted on a staff, the coil may constitute an element of an electrical circuit of which the staff constitutes another element.

8. In combination a hairspring having a spiral inner coil and an anchorage portion integral therewith, a collet consisting of a unitary circular body of hard shape-retaining synthetic resin in which a part of the inner coil with its anchorage portion is embedded and firmly held and surrounded by the material of the collet, said unitary body of resin having a smooth cylindrical peripheral surface and having an axial bore perpendicular to the plane of the spring coil, a portion at least of the inner coil of the spring being exposed outside of the collet, and means spacing the exposed portion of said inner coil from the outer peripheral surface of the coil, the collet having integral upstanding bosses at opposite sides, respectively, of its axial bore.

9. A spring assembly comprising a spiral spring and a collet, the latter consisting of a unitary disk-like circular body of a rigid moldable material capable of being molded at normal room temperatures and in which a portion of the inner coil of the spring is embedded and immovably held, said body having a smooth cylindrical peripheral outer surface, another portion of said inner coil being exposed at the outside of the collet and being united to the first portion by an integral part which emerges from the peripheral surface of the collet and which provides clearance between the peripheral surface of the collet and the exposed portion of said inner coil, said unitary body of material having a bore whose axis is perpendicular to the plane of the spring.

10. A hairspring assembly including a hairspring comprising an inner coil and a collet consisting of a unitary circular disk of substantially uniform axial thickness and of a hard, shape-retaining synthetic plastic, a portion of said inner coil of the spring being embedded and firmly held within the substance of the collet, another portion of said inner coil being exposed outside of the collet, and an integral offset portion of said inner coil uniting the embedded and exposed portions of said inner coil, said offset portion of the spring being operative to space the exposed portion of the inner coil from the periphery of the collet, the collet having a bore perpendicular to the plane of the spring and having a slot extending inwardly from its periphery to said bore.

References Cited in the file of this patent

UNITED STATES PATENTS

| 716,103 | Read | Dec. 16, 1902 |
| 2,567,567 | Kohlhagen | Sept. 11, 1951 |
| 2,649,684 | Dolby | Aug. 25, 1953 |